LIGHT BEAM DEFLECTION

Inventors: Gerald R. Fournier; Charles E. Baker, both of Dallas, Tex.

Assignee: Texas Instruments Incorporated, Dallas, Tex.

Filed: Mar. 30, 1971

Appl. No.: 129,627

Related U.S. Application Data

Division of Ser. No. 758,259, Dec. 31, 1968, Pat. No. 3,614,312.

U.S. Cl. ........................ 350/6, 350/285, 178/7.6
Int. Cl. ............................................. G02b 17/00
Field of Search ........................... 350/6, 7, 285; 178/7.6

References Cited
UNITED STATES PATENTS

| | | | |
|---|---|---|---|
| 3,023,662 | 3/1962 | Hicks, Jr. | 350/7 |
| 3,448,458 | 6/1969 | Carlson et al. | 350/6 |
| 3,524,928 | 8/1970 | Hoskins | 350/6 |
| 3,437,393 | 4/1969 | Baker et al. | 350/6 |
| 2,213,061 | 8/1940 | Zillger | 350/7 |

*Primary Examiner*—David Schonberg
*Assistant Examiner*—Michael J. Tokar
*Attorney*—James O. Dixon et al.

[11] 3,762,791
[45] Oct. 2, 1973

ABSTRACT

A light beam is deflected into a pattern represented by a synthesized sawtooth waveform by means of a light switch and a triangular wave generator. In a video display application, a light switch directs an intensity modulated light beam along one of two paths. When directed along either path, the modulated light beam is incident upon one or the other of a mirror pair. One mirror of the pair reflects a light beam incident thereon from along a first path to the second mirror for reflection therefrom in a pattern approximated by a triangular wave, and the second mirror of the pair reflects a light beam incident thereon from along the second path to the first mirror for reflection therefrom in a pattern approximated by a triangular wave displaced 180° from the first pattern. To generate the approximated triangular waves, the first mirror of the pair oscillates at a frequency $\omega$ to deflect a light beam incident thereon in a pattern represented by the expression ($\sin \omega t$) and the second pair oscillates at a frequency $3\omega$ to deflect a light beam incident thereon in a pattern represented by the expression ($\sin 3\omega t$), where $\omega$ equals the fundamental frequency. The mirrors oscillate in a manner such that the individual patterns produced are optically added. To generate the sawtooth function, only the positive going portion of the triangular wave is selected and the resultant scan patterns are interlaced on the screen.

13 Claims, 10 Drawing Figures

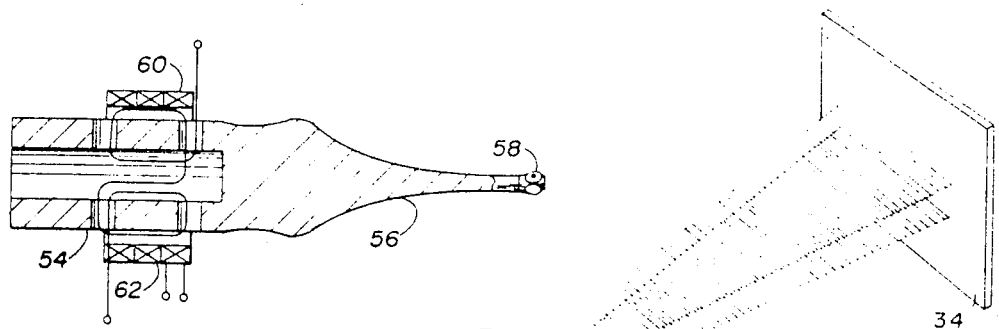
FIG. 5
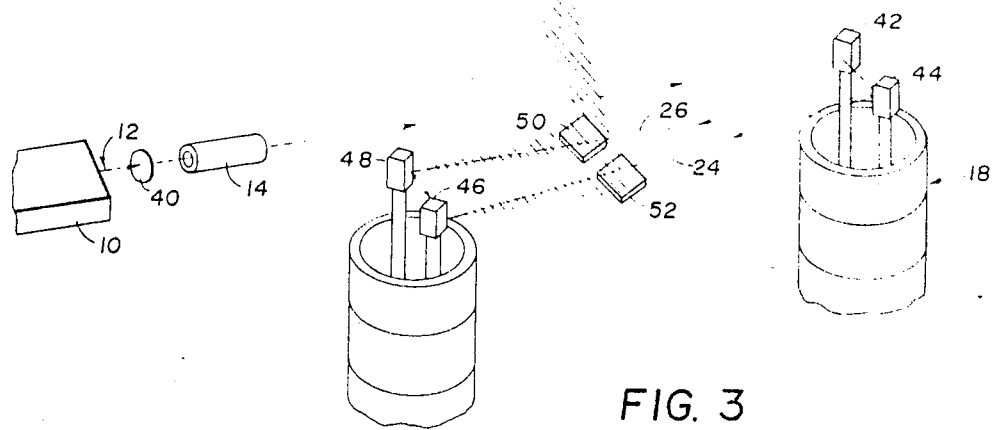
FIG. 3
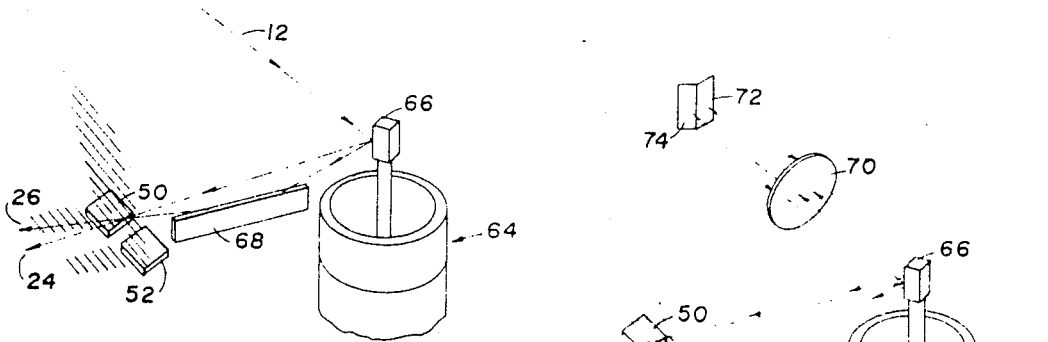
FIG. 6
FIG. 7

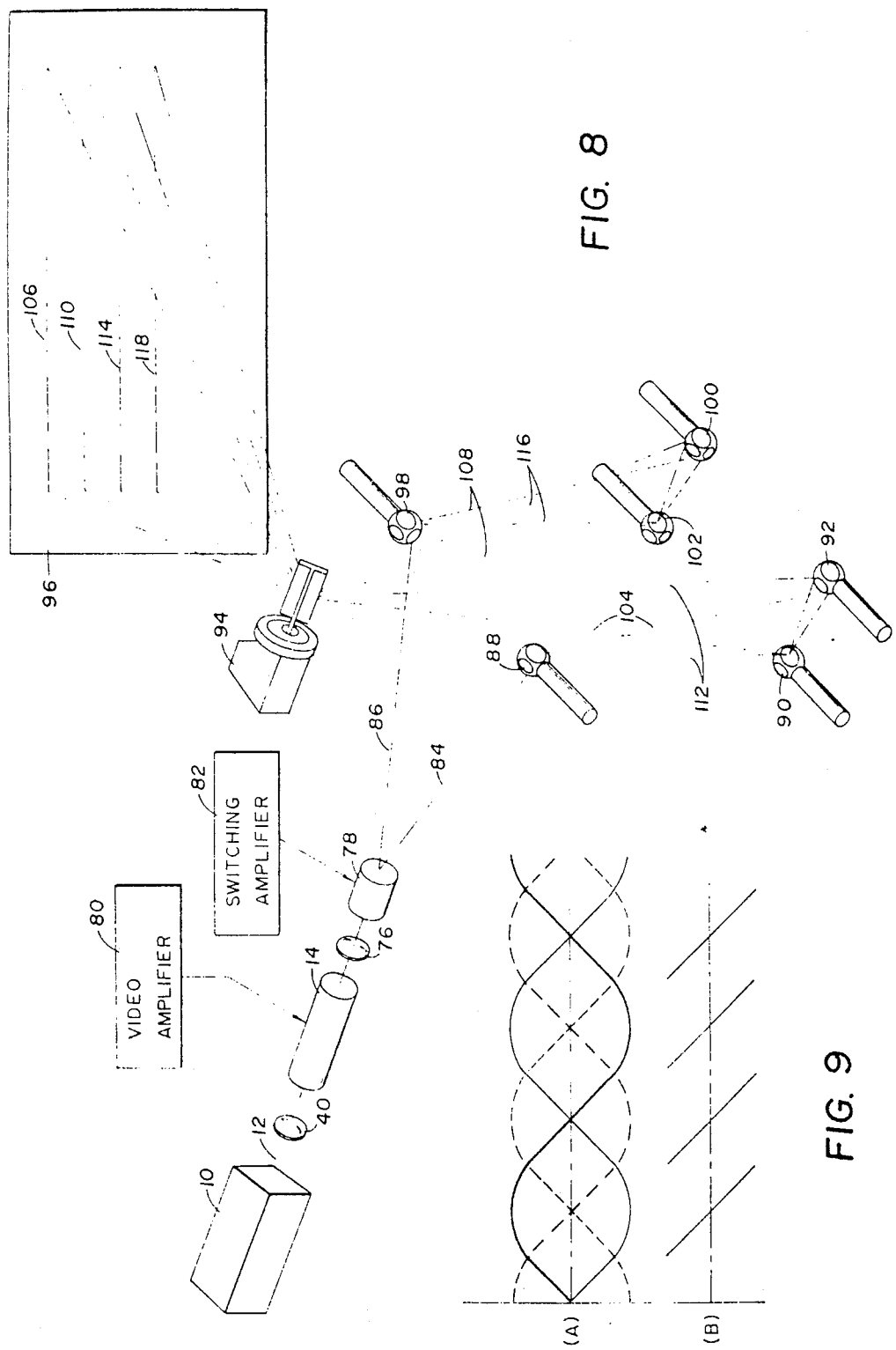

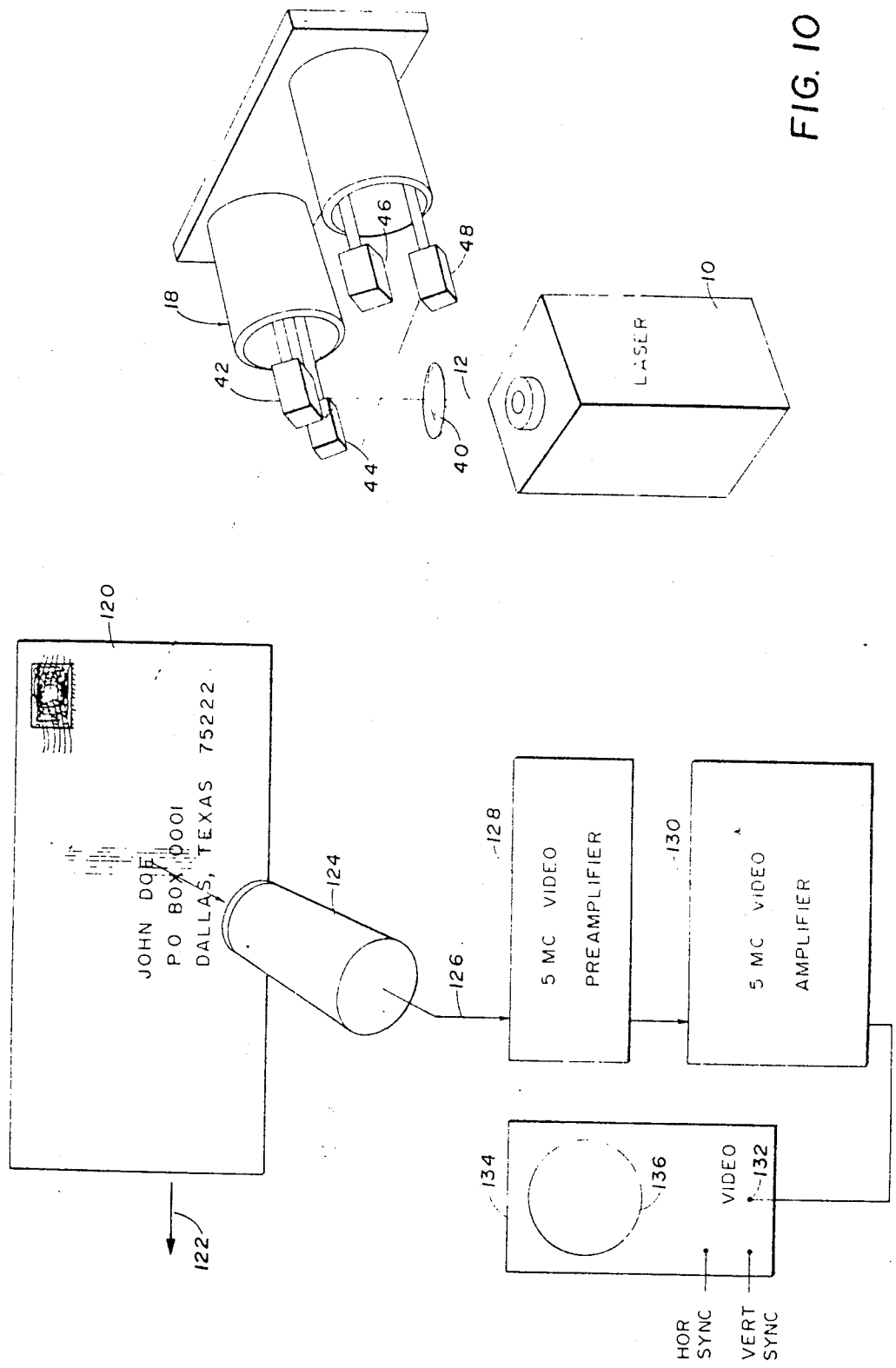

LIGHT BEAM DEFLECTION

This application is a division of U.S. Pat. No. 3,614,312 filed Dec. 31, 1968 and issued Oct. 19, 1971.

This invention relates to light beam deflection, and more particularly to the deflection of a light beam in a pattern represented by a synthesized sawtooth waveform.

As laser operation and capabilities become more widely understood, additional applications of the laser light beam are developed. In the field of communications, there is continuing work on the use of laser light for video displays and radar tracking. In both these applications, the light beam must be scanned in both the horizontal and vertical directions to produce the desired image. Low velocity vertical scanning of the light beam over a given area can be accomplished by a simple deflection system. High velocity horizontal scanning, however, is considerably more difficult.

Consider a video display application, an information carrying light beam is scanned from one side of the display area to the other. It must then be returned to the starting side and deflected again. The "flyback" time, that is, the time required for the light beam to return to the starting side, must be short to minimize bandwidth requirements. This operation is repeated for each scan line in the display. In the United States, present television displays have 525 active scan lines. Thus, the information carrying light beam is deflected from one side of the screen area to the other 525 times before being returned to its starting position.

Communications systems are not the only field in which the collimated light beam of a laser may find application. Considerable effort is being directed to develop a system for reading both special format and handwritten documents. A scanning laser beam provides a way of illuminating very small areas of the document, an apparent requirement for accurately reading handwritten documents.

An object of the present invention is to provide apparatus for scanning a light beam. Another object of this invention is to provide apparatus for deflecting a light beam in a pattern represented by a synthesized sawtooth waveform. A further object of this invention is to provide apparatus for scanning a light beam in a synthesized sawtooth waveform by generating patterns approximated by a triangular wave. An additional object of this invention is to provide apparatus for scanning a light beam by switching between two patterns approximated by triangular waves displaced 180°. Yet another object of this invention is to provide apparatus for scanning a light beam in a synthesized sawtooth waveform pattern approximated by sinusoidal and cosinusoidal functions. Still another object of this invention is to provide apparatus for vertically and horizontally scanning an intensity modulated light beam across a projection screen.

In accordance with this invention, a light beam is deflected along one of two paths by a light switch to a deflector. The deflector produces a first pattern approximated by a triangular wave when the light beam is directed along a first path, and a second pattern approximated by a triangular wave displaced 180° from the first pattern when the light beam is directed along a second path. The light switch changes the light beam between the two paths at a rate such that only a portion of the two triangular wave patterns emerges from the deflector. The critical portion of the triangular waves extends from one peak to the next and may be for either an increasing or decreasing slope.

In accordance with a more specific embodiment of this invention, a light beam is switched between two paths to a first mirror pair by means of a second mirror pair. One mirror of the first pair reflects a light beam incident thereon from along the first path to the second mirror for reflection therefrom in a pattern approximated by a triangular wave. The second mirror of the first pair reflects a light beam incident thereon from along the second path to the first mirror for reflection therefrom in a pattern approximated by a triangular wave displaced 180° from the first pattern. The two mirrors of the first pair oscillate in a manner such that the deflection patterns from each are optically added. In the second mirror pair, a light beam incident on the first mirror is reflected therefrom to the second mirror to be further reflected along one of the two paths. For the second mirror pair, the mirrors oscillate in a manner such that the individual patterns are also optically added.

A more complete understanding of the invention and its advantages will be apparent from the specification and claims and from the accompanying drawings illustrative of the invention.

Referring to the drawings.

Figure 4:
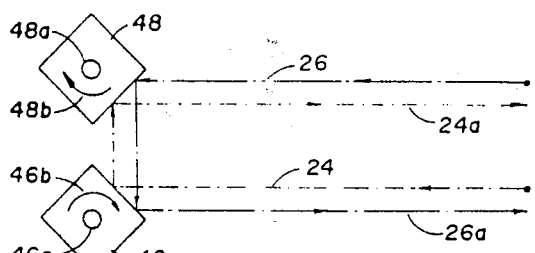

FIG. 3 schematically illustrates a preferred system for light beam switching and generating a synthesized sawtooth waveform;

FIG. 4 is an illustration of the two light paths to and from the deflector of FIG. 3;

FIG. 5 is a schematic of a torsional magnetostrictive drive for the mirrors of FIG. 3;

FIG. 6 illustrates an alternate embodiment of a light switch for the system of FIG. 3;

FIG. 7 is a second alternate of a light switch for deflecting a light beam along one of two paths;

FIG. 8 schematically illustrates another system for producing a video display by deflecting a light beam in a synthesized sawtooth waveform;

FIG. 9 illustrates the wave functions of the system of FIG. 8; and

FIG. 10 is a block diagram of a document-reading system employing a scanning laser beam.

Figure 1:
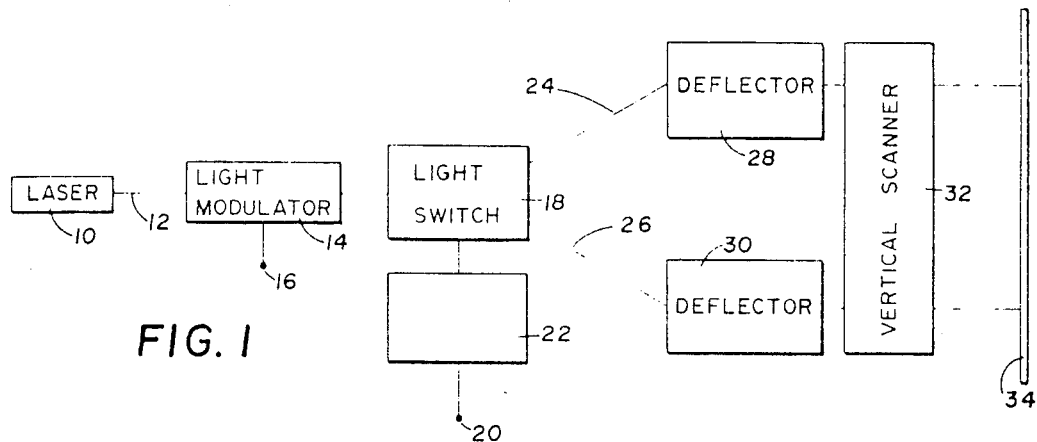
FIG. 1 is a block diagram of a video display system in accordance with the present invention employing a laser light beam.

Referring to FIG. 1, there is shown a block diagram of a laser display system including a laser 10 generating a monochromatic coherent light beam 12 that is intensity modulated by a light modulator 14. A video display signal on a terminal 16 drives the modulator 14 to produce the desired degree of modulation. The modulated light beam is then directed to a digital light switch 18 controlled by horizontal synchronizing pulses on a terminal 20. An amplifier 22, which amplifies the horizontal sync pulses to a suitable level, drives the light switch 18. The light switch 18 has the property of deflecting the light beam 12 along one of two paths, 24 or 26.

Along path 24, the light beam is incident upon a deflector 28 which deflects the light beam 12 in a pattern approximated by a triangular wave. Along the path 26, the light beam is incident upon a deflector 30 which deflects the light beam 12 in a pattern approximated by a triangular wave displaced 180° from the pattern of the deflector 28. Since the light beam 12 is directed along either paths 24 or 26, but not both simultaneously, a vertical scanner 32 receives a light beam pattern from either the deflector 28 or the deflector 30. The vertical scanner 32 reflects the light beam incident thereon to a projection screen 34 to produce a video display by means of a series of vertically displaced horizontal scanning lines in accordance with usual practice. Many devices suitable for vertical scanning are available; their operation is considered to be sufficiently well understood such that additional description will not be given.

Figure 2:
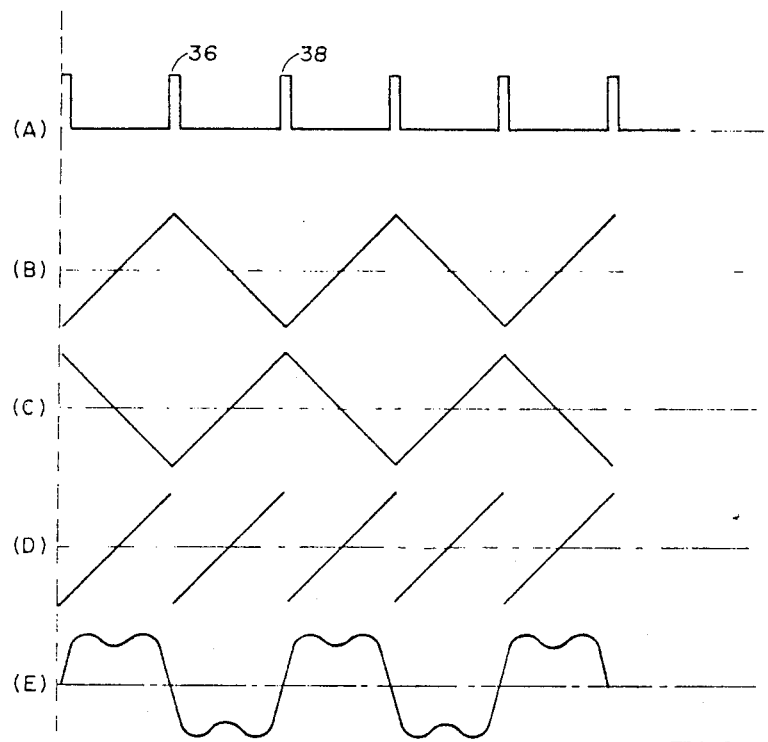
FIG. 2 illustrates waveforms of the system of FIG. 1 for horizontally scanning a light beam.

To generate the horizontal scan lines on the projection screen 34, the vertical scanner 32 receives a synthesized sawtooth waveform from the deflectors 28 and 30, as shown by curve D of FIG. 2. Curve D comprises the positive slopes of the triangular waves illustrated by curves B and C. These triangular shaped curves represent waveforms that would be produced by the deflector 28 and 30, respectively, if each continuously received a light beam. With the system of FIG. 1, however, the light switch 18 changes the position of the light beam 12 between paths 24 and 26 by a series of horizontal synchronizing pulses, such as illustrated at curve A of FIG. 2.

At time $t=0$ assume the light beam 12 has been switched along path 24 by the first sync pulse. The deflector 28 deflects the light beam 12 along the first positive slope of curve B. Upon the occurrence of the sync pulse 36 at terminal 20, the light beam 12 switches from path 24 to path 26. With the light beam 12 along path 26, the deflector 30 generates a light wave as illustrated by the first positive slope of curve C. From the time $t=0$ to the sync pulse 36, only the deflector 28 receives light and the deflector 30 will be dark. During the time interval between the sync pulse 36 and the subsequent sync pulse 38, the deflector 30 generates an output beam while the deflector 28 remains dark. Thus, during the first interval, the vertical scanner 32 receives a light beam from the deflector 28 and during the second time interval the scanner receives a light beam from the deflector 30. Both light beams received by the scanner 32 move in a pattern represented by the positive slope of a triangular shaped wave. Since only the positive slopes of the waves B and C are incident on the vertical scanner 32, the projection to the screen 34 takes the form of a synthesized sawtooth waveform as illustrated by curve D. This sequence of operation continues such that the light beam 12 switches between paths 24 and 26 between subsequent time intervals as established by the synchronizing pulses of curve A.

Referring to FIG. 3, there is shown schematically a system for generating a scanning light beam on the projection screen 34 deflected in a pattern represented by the synthesized sawtooth waveform of curve D of FIG. 2. Like numbers are used throughout this description for like elements. A monochromatic coherent light beam 12 from the laser 10 passes through a collimating lens 40 and then through the light modulator 14. From the light modulator 14, the light beam 12 propagates to the first mirror 42 of a mirror pair including a second mirror 44. The mirrors 42 and 44 comprise one form of the light switch 18. Their oscillating motion is synchronized by the sync pulses at the terminal 20 (FIG. 1). These mirrors oscillate in a manner such that the light beam 12 is reflected from the mirror 44 along either path 24 or path 26. A light beam along the path 24 is incident on a mirror 46 of a mirror pair including a second mirror 48. A light beam impinging on the mirror 46 is reflected to the mirror 48 and reflected therefrom to a mirror 50. A light beam along the path 26 impinges on the mirror 48 and is reflected therefrom to the mirror 46 and again reflected to a mirror 52. Reflection patterns on the mirrors 50 and 52 are directed to the vertical scanner 32 and then to the projection screen 34. The waves incident on the mirrors 50 and 52 have a pattern approximated by a triangular wave, one of which is 180° displaced from the other, such as curves B and C of FIG. 2.

To deflect a light beam along the path 24 from the mirror 48 in a pattern approximated by a triangular wave, and a light beam along path 26 from the mirror 46 in a pattern approximated by a triangular wave 180° displaced from the first pattern, the mirror pair 46 and 48 is made to oscillate about parallel axes at right angles to a plane through the paths 24 and 26. Consider a triangular wave such as shown by curves B and C of FIG. 2, the Fourier transform of such waves is given by:

$$F(t) = K(\sin \omega t - 1/3^2 \sin 3\omega t + 1/5^2 \sin 5\omega t) \quad (1)$$

where $\omega$ equals the fundamental frequency. It has been shown that a curve plotted in accordance with the above transform compares favorably with a pure triangular wave. Calculations have also shown that curves plotted using the above transform have a 1 percent linearity over about 80 percent of the total waveform. Thus, to generate a triangular wave it is only necessary to generate the first (fundamental) harmonic and subsequent odd harmonics. In fact, a reasonably accurate representation of a triangular wave can be generated by the first and third harmonics.

To generate a wave made up of the first and third harmonics from a light beam long the paths 24 or 26 to produce the curves B and C to the vertical scanner 32, the mirror 46 is made to oscillate at the fundamental frequency and the mirror 48 oscillates at the third harmonic.

Referring to FIG. 4, there is shown a light beam along the path 24 striking the mirror 46 and reflected therefrom to the mirror 48. The mirror 46 is made to oscillate about an axis 46a at a frequency $\omega$ that is, the first harmonic. A light beam along the path 24 reflected from the mirror 46 will be reflected in a pattern represented by $(\sin \omega t)$. This is the first term, less a constant, of the Fourier transform of a triangular wave. Thus a beam of light along the path 24 reflected from the mirror 46 to the mirror 48 is incident upon the mirror 48 in a pattern represented by $(\sin \omega t)$. If this pattern were reflected off of mirror 48 while it was stationary, the resultant light beam would be represented by $-(\sin \omega t)$ which is the mirror image of the light pattern reflected from mirror 46.

If the mirror 48 is made to oscillate about an axis 48a at the third harmonic frequency ($3\omega$), a light beam will be reflected therefrom in a pattern represented by $(\sin 3\omega t)$. This is the second term in the Fourier transform above. If the mirrors 46 and 48 are made to oscillate in the direction of the arrows 46b and 48b, respectively, then the light pattern along the path 24a will be given by the expression:

$$F(t) = -\sin \omega t + 1/9 \sin 3\omega t \quad (2)$$

which is the first and second term in the Fourier transform of a triangular wave and the signs indicated the mirrors 46 and 48 are oscillating in the same direction.

By a similar analysis, a light beam along the path 26 is incident on the mirror 48 and reflected therefrom in a pattern represented by (sin 3ωt) to the mirror 46. To this third harmonic term deflected from the mirror 48, a fundamental harmonic term is optically added therewith by the oscillations of the mirror 46. The resultant deflection pattern along the path 26a is then given by the expression:

$$F(t) = \sin \omega t - 1/9 \sin 3\omega t \quad (3)$$

which is the equation for an approximated triangular wave displaced 180° from the approximated triangular wave along the path 24a. Thus, by oscillating the mirror 46 at a frequency ω and the mirror 48 at the frequency 3ω and directing a light beam either along path 24 or 26, approximated triangular wave patterns are directed to the mirrors 50 and 52 which are displaced 180°.

To deflect the light beam 12 along either the path 24 or 26, the switch 18 may include a mirror arrangement similar to that illustrated in FIG. 4. The mirror 42 receives the light beam 12 from the modulator 14 and reflects it to the mirror 44. By oscillating the mirror 42 at the fundamental frequency ω (the same fundamental frequency at which the mirror 46 oscillates), the light beam reflected therefrom will have a pattern represented by (sin ωt). This pattern is reflected to and incident upon the mirror 44 which oscillates at the third harmonic frequency (3ω) to produce a pattern represented by (sin 3 ωt). Instead of the mirrors 42 and 44 oscillating in a manner to produce an approximated triangular wave, the mirrors are made to oscillate in a manner such that the pattern of the light beam reflected from the mirror 44 will be represented by an approximate square wave as illustrated at FIG. 2E. During the time interval from time t=0 to the synchronizing pulse 36, the mirrors 42 and 44 will be in a position such that the light beam 12 will be along path 24, as indicated by the first positive section of the curve E. Between the synchronizing pulse 36 and the synchronizing pulse 38, the mirrors 42 and 44 will have oscillated to a position such that the light beam will be along path 26 as indicated by a first negative section of the curve E.

In the interval when the light beam 12 is being switched from along the path 24 to along path 26 or vice versa, the beam will not impinge on either mirror 46 or mirror 48. By properly synchronizing the operation of the mirrors 42 and 44 with the mirrors 46 and 48 by means of the horizontal sync pulses, this switching interval can be made to occur during the 20 percent non-linear portion of the triangular wave.

As previously discussed, an information carrying light beam is scanned across a projection screen as an array of horizontal or substantially horizontal lines. During the time when the scanning light beam returns from the end of one line to the beginning of the next line, the beam must be dark to present a clear image on the projection screen. If the vertical scanner 32 is synchronized with the mirrors 42 and 44, the "flyback" from the even-numbered to the odd-numbered scan lines can be made to occur when the light beam 12 switches from along path 24 to along path 26. The flyback from the odd-numbered to the even-numbered scan lines can be timed to occur when the beam switches from along path 26 to along path 24. Thus, subsequent scan lines will be projected to the scanner 32 alternating between the mirrors 50 and 52. This offers a definite advantage in that the system operates at one-half the scan rate established for image projection on the screen 34. For example, if the scan rate on the screen 34 is 15,000 lines per second, then the mirrors 42 and 46 oscillate at 7,500 cycles per second.

To oscillate the mirrors of the first mirror pair 46 and 48, and the second mirror pair 42 and 44, the torsional magnetostrictive drive illustrated in FIG. 5 may be used. A complete description of a torsional magnetostrictive drive will be found in the co-pending United States application of Charles E. Baker et al., Ser. No. 583,214, filed Sept. 30, 1966, now U.S. Pat. No. 3,437,393 and assigned to the assignee of the present invention. Basically, the driver of FIG. 5 is made of magnetostrictive material preferably having a constant temperature modulus and includes a hollow cylindrical base 54 and a torsional transducer 56 integrally formed with the base and having a multi-facet block 58 upon which a mirror is mounted or formed. Typically, the transducer 56 is a minaret-shaped body with a needle-like end with a flat surface for the side mount of a mirror. The transducer amplifies torsional motion transferred to the base 54. A single turn drive winding 60 is threaded through the base 54 and upon energization thereof by sinusoidal alternating currents imparts torsional vibrations to the base 54. The vibrations are mechanically amplified by the transducer 56, thereby imparting relatively large angle deflections of a beam of light striking a mirror on the block 58.

A bias coil 62 connected to the DC control current provides a magnetic bias longitudinal to transducer 56. This bias can also be obtained from permanent magnets. When using the bias magnet 62, the DC current is adjusted for best results with the peak field due to the signal at a value less than the polarizing field.

In FIG. 3, to transducers 56 are biased by a single permanent magnet. Each of the multi-facet blocks to which the various mirrors are mounted would be formed integrally with one transducer. Each transducer amplifies the torsional motion set up by a sinusoidal alternating current coupled to individual drive windings. These windings are energized by either first harmonic or third harmonic signals, as discussed previously, that are synchronized by the horizontal sync pulses.

In addition to the mirror pair switch illustrated in FIG. 3, other switching devices are possible. Referring to FIG. 6, there is shown another switch for directing the light beam 12 along the path 24 or the path 26. A single torsional magnetostrictive drive 64 imparts oscillatory motion to a multi-facet block on which is mounted a mirror 66. In one position for the mirror 66, the light beam 12 reflects directly along the path 24, and in another position of the mirror 66 along the path 26 from a scan inverting mirror 68. For the switching arrangement of FIG. 6, the mirror 66 oscillates between positions at each occurrence of a horizontal sync pulse. Thus, in this switching arrangement, the sinusoidal alternating current connected to the drive winding of the magnetostrictive drive 64 has a frequency equal to one-half the number of scan lines per second on the projection screen 34.

Other than for a change in the light switch 18, the system illustrated in FIG. 3 would be unchanged. A light beam along the path 24 is reflected from the mirror 46 to the mirror 48 and then from the mirror 50 to the vertical scanner 32. A light beam along the path 26 is reflected from the mirror 48 to the mirror 46, and then from the mirror 52 to the vertical scanner 32.

As another alternative, the mirror pair switch 18 of FIG. 3 may be replaced by the digital light switch illustrated in FIG. 7. Referring to FIG. 7, there is shown the torsional magnetostrictive drive 64 for oscillating a mirror 66 mounted to a multi-facet block on a torsional transducer. The light beam 12 reflects from the mirror 66 to a double convex lens 70 and then to one side of a mirror arrangement including side-by-side mirrors 74 and 74. Light incident on the mirrors 72 and 74 is reflected therefrom along either path 24 or 26. Two time-dependent stable beams are produced by the scanning light beam 12 sinusoidally through the lens 70 to the mirrors 72 or 74. The mirrors 72 and 74 are positioned such that the positive and negative halves of the sinusoidal wave produced by oscillating the mirror 66 are separated and reflected back through the lens 70 from the mirror 66, thus removing the scanning function. The beams along the paths 24 or 26 are separated in time and space by virtue of the angle between the mirrors 72 and 74. Again, as was the case of the switch of FIG. 6, the mirror 66 oscillates at a frequency equal to one-half the scanning rate of the lines of the projection screens 34.

In addition to generating a scanning pattern represented by a synthesized sawtooth waveform from two triangular shaped patterns, a synthesized sawtooth waveform may also be produced by using the linear portions of a series of sinusoid waveforms. Referring to FIG. 8, there is shown a video display system including the laser 10 generating a monochromatic coherent light beam 12. The light beam 12 passes through the collimating lens 40, the modulator 14, and a spot-focusing lens 76 to a Wollaston prism switch 78. The modulator 14 is driven by the output of a video amplifier 80 which may be any one of many commercially available amplifiers. The prism switch 78 is energized by the output of a switching amplifier 82 which produces a train of sync pulses as illustrated in FIG. 2A. A common method of digitally steering a light beam is by using a KDP crystal and a Wollaston prism. Such systems have been thoroughly discussed in the literature and additional description is not deemed necessary. In addition to the prism switch 78, the light beam switches illustrated in FIGS. 3, 6, and 7 could be used with the system of FIG. 8.

The prism switch 78 deflects the light beam along either a path 84 or a path 86. Along the path 84 a light beam is reflected from a scanning mirror 88 to a mirror pair including mirrors 90 and 92. In one position of the mirror 88, a light beam along the path 84 is reflected to the mirror 92 and then to the mirror 90. From the mirror 90, the light beam is reflected to a vertical scanner 94 and then to a projection screen 96. In the second position of the mirror 88, a light beam along the path 84 is deflected to the mirror 90 and then to the mirror 92. From the mirror 92, the light beam is reflected to the vertical scanner 94 and to the projection screen 96.

A light beam along the path 86 is reflected from a scanning mirror 98 to a mirror pair including mirrors 100 and 102. In one position of the scanning mirror 98, a light beam along the path 86 is reflected to the mirror 100 and reflected therefrom to the mirror 102. From the mirror 102 a light beam is reflected to the vertical scanner 94 and then to the projection screen 96. In the second position of the scanning mirror 98, a light beam along the path 86 is reflected to the mirror 102 and then to the mirror 100. From the mirror 100 the light beam is reflected to the vertical scanner 94 and then to the projection screen 96. Each of the mirrors 88, 90, 92, 98, 100, and 102 are mounted on a multi-facet block formed integrally with a torsional transducer of the type explained with reference to FIG. 5. Thus, these mirrors may be made to oscillate at a selected frequency, and by appropriate synchronzing circuitry, made to operate synchronously.

With the system illustrated in FIG. 8, by suitably arranging the array of mirrors 88, 90, 92, 98, 100 and 102, each operating at a different phase, but at the same frequency, and them switching the light beam 12 to be deflected from one mirror to another at the appropriate time, an approximately linear line scan may be achieved. Assume the scanning mirror 88 oscillates by means of a low amplitude sinusoidal scanning function and the mirror 90 is driven by a cosinusoidal function. If the mirror 92 is held in a fixed position, a light beam reflected from the mirror 88 to the mirror 90 and then to and from the mirror 92 will be deflected at the vertical scanner 94 in a pattern approximated by the equation:

$$\theta_1 = -\cos \omega t \tag{4}$$

where $\theta_1$ is the deflection angle and $\omega$ the angular frequency of the energy causing the oscillations of the mirrors 88 and 90. Similarly, if the mirror 88 is driven by a sinusoidal function and the mirror 92 driven by a cosinusoidal function with the mirror 90 held fixed, a light beam deflected from the mirror 88 to the mirror 92 then to and from the mirror 90 will produce a pattern on the vertical scanner 94 approximated by the equation:

$$\theta_2 = \cos \omega t. \tag{5}$$

If the light beam 12 is now switched from along the path 84 to the path 86, a similar analysis will show that by driving the mirror 98 with a cosinusoidal function and the mirrors 100 and 102, alternately, with a sinusoidal function, a third and fourth light pattern will be deflected to the vertical scanner 94. A light beam reflected from the cosinusoidally driven mirror 98 to the sinusoidally driven mirror 100 and then to the stationary mirror 102 produces a deflection pattern given by the equation:

$$\theta_3 = -\sin \omega t. \tag{6}$$

A light beam along the path 86 reflected from the cosinusoidally driven mirror 98 to the sinusoidally driven mirror 102 and then to the stationary mirror 100 will be deflected to the scanner 94 in a pattern approximated by the equation:

$$\theta_4 = \sin \omega t. \tag{7}$$

The four scanning functions thus generated are illustrated in FIG. 9A. Portions of the sinusoidal functions illustrated between the −45° and +45° position are linear to within approximately 5 percent. By arranging for the light beam 12 to be switched from along path 84 to path 86, and vice versa, at the 45° points on the scanning waveforms, the scanning function illustrated in FIG. 9B may be achieved. This is the desired horizontal line scan function for a video display on the projection screen 96.

In the operation of the system of FIG. 8, from time $t=0$ to the first synchronizing pulse, the modulating light beam 12 will be along the path 84. With the mirrors 88 and 92 driven and the mirror 90 stationary, a light beam will travel along the path 104 to be projected as the first scanning line 106 on the projection screen 96. At the occurrence of the first horizontal sync pulse, the light beam 12 will be switched to the path 86. The mirrors 98 and 100 will be driven and the mirror 102 held stationary and the light beam 12 travels the path 108 to be projected on the screen 96 as the scan line 110. When the second horizontal sync pulse occurs, the light beam will be again switched to along the path 84. The mirrors 88 and 90 will be driven and the mirror 92 held stationary. The light beam 12 travels the path 112 to be projected as the scanning line 114 on the projection screen 96. Upon occurrence of the next sync pulse, the beam 12 will be again switched to along the path 86. The mirrors 98 and 102 will be driven and the mirror 100 held stationary. During this cycle, a light beam will travel the path 116 to be projected on the screen 96 as the scan line 118. By synchronizing the scanning system such that only the portions of the sinusoidal scanning functions of FIG. 9A between ±45° impinges upon the projection screen 96, the polarity of the light modulator can be controlled such that positive video modulation is viewed on the screen and negative video occurs during the interval when the scanned light beam is changing from along path 84 to path 86, or vice versa.

Since the laser is a new source of visible light, it was natural for display application to be among the first uses investigated. An application somewhat related to the display application is that of object or image reproduction. Referring to FIG. 10, there is shown a system for reproducing the printing on a document including the light switch 18 and a pair of oscillating mirrors 46 and 48 for synthesizing a sawtooth light beam waveform projected to a document 120. The laser 10 generates a monochromatic coherent light beam 12 that is transmitted through a collimating lens 40 to impinge on the mirror 42 of a mirror pair that includes the mirror 44. As explained previously, a light beam impinging on the mirror 42 is switched along one of two paths to the mirrors 46 and 48 and subsequently reflected therefrom in a pattern synthesizing a triangular wave. This light pattern reflected from the mirrors 46 and 48 will cause a beam of light to illuminate discrete areas of the document 120 as it moves in the direction of the arrow 122. In display systems, vertical deflection of the light beam from the mirrors 46 and 48 was required to give vertical deflection to the light beam. In the system of FIG. 10, however, movement of the document 120 on a conveyor (not shown) produces the vertical deflections.

As the light beam 12 is scanned across the document 120, a photomultiplier tube 124, or other similar device, as part of a reading station, responds to the light reflected from the document. When the light beam strikes a dark object, such as a portion of a letter, the tube 124 receives only a small amount of light. On the other hand, as the scanning light beam impinges on a white area, considerable light will be reflected to the tube 124. In the former case, the tube 124 generates a low magnitude signal whereas in the latter case a signal of high magnitude will be generated on a line 126 connected to the input of a 128. From preamplifier 128. From the video preamplifier 128, the signal on line 126 is connected as one input to a video amplifier 130. Video preamplifiers and amplifiers are believed sufficiently well understood in their operation such that additional description is not deemed necessary. The video signal from the amplifier 130 connects to the video terminal 132 of a display 134. The display 134 may be a standard television receiver that displays on a cathode-ray tube 136 the characters printed from the document 120. In addition to cathode-ray tube display systems, other displays may be used, such as direct view storage tubes. By synchronizing the operation of the mirrors 42, 44, 46 and 48 with the horizontal sync signal to the display 134, and the movement of the document 120 with the vertical sync, a display on the tube 136 will be a reproduction of the characters on the document.

Flying-spot scanning systems, such as that shown in FIG. 10, are the simplest of the nonstorage pickup systems. Essentially, it consists of a source of unmodulated light which is mechanically-electrically controlled to scan an object or image. In the system shown, the light source is supplied by a laser beam deflected to produce a synthesized triangular wave by the mirrors 42, 44, 46 and 48 operating in the manner described earlier. Light reflected from an object (which can be located in a fixed position and changing) or an image impinges on the tube 124 that converts variations in the light reflected from the scanned object or image into electrical signals; the wide band video amplifier 130 then increases the signal levels and presents a low impedance for output cable matching. The signal amplitude from the video amplifier 130 is dependent upon the light reflected from the object or image to the tube 124. The output of the video amplifier 130 need not be connected directly to the display 134. This signal can be transmitted over a standard television system.

When using the system of FIG. 10 as a camera to generate video signals of a changing object or image in a fixed location, the vertical scanner 32 of FIG. 3 is required. The scanner 32 then provides the vertical deflection generated by movement of the document 120 in the direction of the arrow 122. Signals produced at the output of the video amplifier 130 would be similar to standard television signals with similar picture producing capabilities. Thus, the system of FIG. 10 takes advantage of the simplicity and high resolution capabilities inherent with flying-spot scanning systems while overcoming the problem of sensitivity due to insufficient reflected light by using the collimated beam of a laser as the light source.

While several embodiments of the invention, together with modifications thereof, have been described in detail herein and shown in the accompanying drawings, it will be evident that various further modifications are possible without departing from the scope of the invention.

What is claimed is:

1. Apparatus for scanning a light beam in a pattern represented by a synthesized sawtooth waveform comprising:

means for switching a light beam incident thereon in a first and second direction, means for reflecting a light beam from said means for switching and received from said first direction in a first pattern approximated by a first triangular wave defined by $-K_1 \sin \omega t + K_2 \sin 3\omega t$, and in a second pattern approximated by a second triangular wave displaced 180° from the first triangular wave when received from said second direction and defined by $K_3 \sin \omega t - K_4 \sin 3\omega t$, where $\omega$ is the fundamental frequency of the reflecting means and $K_1$–$K_4$ are constants.

2. Apparatus for scanning a light beam in a pattern represented by a synthesized sawtooth waveform as set forth in claim 1 wherein said reflecting means includes an oscillating mirror pair, one of said mirrors reflecting a light beam incident thereon from said first direction to the second of said mirrors for reflection therefrom to approximate said first triangular wave, and the second of said mirrors reflecting a light beam incident thereon from said second direction to the first of said mirrors for reflection therefrom to approximate said second triangular wave.

3. Apparatus for scanning a light beam in a pattern represented by a synthesized sawtooth waveform as set forth in claim 2 wherein one mirror of said mirror pair oscillates at a frequency $\omega$ to reflect a light beam incident thereon in a pattern represented by $(\sin \omega t)$ and the second mirror of said pair operates at a frequency $3\omega$ to reflect a light beam incident thereon in a pattern represented by $(\sin 3\omega t)$.

4. Apparatus for scanning a light beam in a pattern represented by a synthesized sawtooth waveform as set forth in claim 1 wherein said switching means includes an oscillating mirror pair, one of said mirrors reflecting a light beam incident thereon to the second of said mirrors for reflection therefrom along the first and second directions to said reflecting means.

5. Apparatus for scanning a light beam in a pattern represented by a synthesized sawtooth waveform as set forth in claim 4 wherein one mirror of said pair oscillates at a frequency $\omega$ to reflect a light beam incident thereon in a pattern represented by $(\sin \omega t)$ and the second mirror oscillates at a frequency $3\omega$ to reflect a light beam incident thereon in a pattern represented by $(\sin 3\omega t)$ and the mirrors oscillate in a direction such that the light beams are optically added.

6. Apparatus for scanning a light beam in a pattern approximated by a triangular wave comprising:

a mirror pair, one mirror of said pair reflecting a light beam incident thereon to a second mirror of said pair for reflection therefrom, first means for harmonically oscillating one of the mirrors of said pair at a frequency $\omega$ to reflect a light beam incident thereon defined by $(\sin \omega t)$, and second means for harmonically oscillating the other mirror of said pair at a frequency $3\omega$ to reflect a light beam incident thereon defined by $(\sin 3\omega t)$, where $\omega$ equals the fundamental harmonic of the approximated triangular wave and said mirrors oscillate to optically add the light beams reflected therefrom.

7. Apparatus for scanning a light beam in a pattern approximated by a triangular wave as set forth in claim 6 wherein:

the oscillating means for said mirror pair comprises a torsional magnetostrictive drive.

8. Apparatus for scanning a light beam in a pattern represented by a synthesized sawtooth waveform comprising:

a first mirror pair, one mirror of said first pair reflecting a light beam incident thereon in a first direction to the second mirror of said first pair for reflection therefrom in a first pattern approximated by a triangular wave, and the second mirror of said first pair reflecting a light beam incident thereon from a second direction to the first mirror for reflection therefrom in a second pattern approximated by a triangular wave displaced 180° from the first pattern when received along a second path, a second mirror pair, one mirror of said second pair reflecting a light beam incident thereon to the second mirror of said second pair for reflection therefrom between said first and second directions to said first mirror pair, and means for individually oscillating the mirrors of said second mirror pair to reflect the light beam therefrom between the first and second directions in a manner such that the time said light beam remains along each of said two directions approximately equals the time required for the light beam to be reflected between opposite peaks of the approximated triangular waves.

9. Apparatus for scanning a light beam in a pattern represented by a synthesized sawtooth waveform as set forth in claim 8 wherein:

one mirror of said first pair oscillates at a frequency $\omega$ to reflect a light beam incident thereon in a pattern represented by $(\sin \omega t)$ and the second mirror of said first pair oscillates at a frequency $3\omega$ to reflect a light beam incident thereon in a pattern represented by $(\sin 3\omega t)$, where $\omega$ equals a fundamental harmonic frequency and the mirrors oscillate to optically add the patterns of said first pair, and one mirror of said second pair oscillates at a frequency $\omega$ to reflect a light beam incident thereon in a pattern represented by $(\sin \omega t)$ and the second mirror of said second pair oscillates at a frequency $3\omega$ to reflect a light beam incident thereon in a pattern represented by $(\sin 3\omega t)$, where $\omega$ equals a fundamental harmonic frequency and the mirrors oscillate in a direction to optically add the individual patterns to produce a synthesized square wave.

10. Apparatus for scanning a light beam in a pattern represented by a synthesized sawtooth waveform as set forth in claim 9 including oscillating means connected to each mirror of said first pair for oscillating the individual mirrors at the desired frequency.

11. Apparatus for scanning a light beam in a pattern represented by a synthesized sawtooth waveform as set forth in claim 10 wherein said oscillating means includes torsional magnetostrictive drives.

12. Apparatus for scanning a light beam in a pattern represented by a synthesized sawtooth waveform comprising:
   means for switching a light beam incident thereon between a first direction and a second direction,
   a first scanning mirror for reflecting the light beam from said first direction into first and second subdirections,
   a first mirror pair, one mirror of said first pair reflecting a light beam incident thereon from said first subdirection to the second mirror of said first pair for reflection therefrom in a first pattern approximated by a first sinusoidal function, and the second mirror of said first pair reflecting a light beam incident thereon from said second subdirection to the first mirror for reflection therefrom in a second pattern approximated by a sinusoidal function displaced 180° from the first sinusoidal function,
   a second scanning mirror for reflecting the light beam from the second direction into a third and a fourth subdirection, and
   a second mirror pair, one mirror of said second pair reflecting a light beam incident thereon from along the third subdirection to the second mirror of said second pair for reflection therefrom in a third pattern approximated by a third sinusoidal function displaced 90° from the first sinusoidal function, and the second mirror of said second pair reflecting a light beam incident thereon from the fourth subdirection to the first mirror for reflection therefrom in a fourth pattern approximated by a sinusoidal function displaced 180° from the third sinusoidal function.

13. Apparatus for scanning a light beam in a pattern represented by a synthesized sawtooth waveform as set forth in claim 12 wherein said first scanning mirror and the mirrors of said second pair oscillate at a frequency $\omega/4$ to deflect a light beam incident thereon in a pattern represented by $\pm\sin(\omega/4)t$, and the scanning mirror and the mirrors of said first pair oscillate at a frequency $\omega/4$ to deflect a light beam incident thereon in a pattern represented by $\pm\cos(\omega/4)t$.

* * * * *